United States Patent Office 3,334,073
Patented Aug. 1, 1967

3,334,073
POLYALKENESULFIDE PRODUCTION
Paul Kobetz, Baton Rouge, La., assignor to Ethyl Corporation, New York, N.Y., a corporation of Virginia
No Drawing. Filed Mar. 27, 1964, Ser. No. 355,404
6 Claims. (Cl. 260—79)

This invention relates to and has as its chief object the production of sulfur containing polymers and more particularly to a novel process for the production of polyalkene sulfides.

These and other objects are accomplished by reacting a dihalogenated hydrocarbon compound with hydrogen sulfide in the presence of a Friedel-Crafts reagent.

The dihalogenated hydrocarbon compound is depicted by the following formula:

X—R—X wherein X is a halogen and R is a hydrocarbon group containing from 2 to about 10 carbon atoms. Preferably X is chlorine and R is a saturated hydrocarbon group containing from 2 to about 5 carbon atoms. 1,2-dihaloethane is a preferred reagent and 1,2-dichloroethane is an exceptionally preferred reagent due to its commercial availability and the excellent results achieved therewith.

The polyalkene sulfides produced according to this invention are depicted by the following formula:

$$X-[R-S]_n-R-X$$

wherein X and R are as defined hereinabove and $n$ is an integer from 1 to about 1000.

The Friedel-Crafts reagent is aluminum or iron chloride and preferably aluminum chloride.

According to the process of this invention hydrogen sulfide is generally bubbled into a liquid phase reaction system containing the dihalogenated hydrocarbon compound and the Friedel-Crafts reagent. Of course, liquid hydrogen sulfide may be employed if desired but preferably the hydrogen sulfide is introduced into the reaction zone as a gas at temperatures of from 0° C. to the boiling point of the system and at pressures of from atmospheric to 200 p.s.i.g. In the most preferred embodiment of this invention the reaction is conducted at a temperature of from about 30° C. to about 95° C. and at pressures from about atmospheric to about 20 p.s.i.g.

The polymer formed is generally a solid or semi-solid under reaction conditions and is recovered from the reaction zone by any convenient method such as filtration, decantation, evaporation, and the like.

In order that those skilled in the art may better understand the process of this invention the following example is given by way of description and not by way of limitation.

EXAMPLE I 150 grams of 1,2-dichloroethane and 5 grams of aluminum chloride were charged into a reaction vessel equipped with a reflux condenser and heating device. The contents of the reaction vessel were heated to a temperature of 80° C. Gaseous hydrogen sulfide was introduced into the reaction vessel at about atmospheric pressure. Shortly after the introduction of the hydrogen sulfide, polyethylene sulfide particles began to precipitate. 4.5 grams of the polymer were recovered which melted at 146–148° C.

EXAMPLES II–V

Similar results are achieved when 1,2-dibromoethane is employed. The above reaction is repeated except that 1,3-dichloropropane is employed and polypropylene sulfide is produced. Similarly when 1,4-difluorobutane is employed polybutylene sulfide is produced and when 1,10-dichlorodecane is employed polydecene sulfide is produced.

While this invention is described primarily with respect to the use of dihalogenated alkanes other dihalogenated hydrocarbon compounds may be employed such as those containing one or more carbon to carbon double or triple bonds. The hydrocarbon portion may also contain substituents such as hydroxy groups, halogens, and

—NR₂' groups wherein R' is hydrogen or an alkyl group containing from 1 to about 10 carbon atoms and be interrupted at one or more positions between the carbon atoms by groups such as

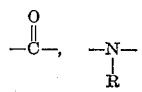

wherein R' as defined hereinabove, and —S—.

The process is conducted with or without a solvent. Usually the dihalogenated hydrocarbon compound serves as sufficient solvent, however materials such as hexane, kerosene, benzene, petroleum ether may be employed.

The Friedel-Crafts reagent is employed generally in stoichiometric quantities, that is for each sulfur linkage, —C—S—C—, formed one atom of Friedel-Crafts reagent is needed.

The polymers of this invention find utility in the manufacture of synthetic rubbers, adhesives, plastics and other similar materials.

I claim:

1. A process for producing polyalkene sulfides comprising reacting together a dihalogenated hydrocarbon compound containing from 2 to about 10 carbon atoms, hydrogen sulfide and a Friedel-Crafts reagent.

2. The process of claim 1 wherein said dihalogenated hydrocarbon compound is a 1,2-dihaloethane.

3. The process of claim 1 wherein said dihalogenated hydrocarbon compound is 1,2-dichloroethane.

4. The process of claim 1 conducted at a temperature of from about 0° C. to about the boiling point of the reaction mixture.

5. The process of claim 1 wherein said Friedel-Crafts reagent is aluminum chloride.

6. A process for producing polyethylene sulfide comprising reacting together 1,2-dichloroethane, hydrogen sulfide and aluminum chloride at a temperature of from about 30° C. to about 45° C. and at a pressure from about atmospheric to about 20 p.s.i.g.

References Cited
UNITED STATES PATENTS

| 2,472,470 | 6/1949 | Eby | 260—609 |
| 2,472,471 | 6/1949 | Eby | 260—609 |
| 2,490,257 | 12/1949 | Crowley et al. | 260—79 |

DONALD E. CZAJA, Primary Examiner.

LEON J. BERCOVITZ, Examiner.

M. I. MARQUIS, Assistant Examiner.